UNITED STATES PATENT OFFICE 2,542,932

PROCESS OF MANUFACTURING DRY STARCH PREPARATIONS SOLUBLE IN COLD WATER

Jan Lolkema, Hoogezand, and Willem Albertus van der Meer, Haren, Netherlands, assignors to Naamlooze Vennootschap: W. A. Scholten's Chemische Fabrieken, Groningen, Netherlands, a corporation of the Netherlands No Drawing. Application November 1, 1946, Serial No. 707,322. In the Netherlands June 20, 1945

Section 1, Public Law 690, August 8, 1946
Patent expires June 20, 1965

6 Claims. (Cl. 260—17.2)

In the process of finishing textile products with starch products it is known to fix the starch so that it will be proof against washing with the aid of synthetic resins. For this purpose there is made a starch paste to which the components of the synthetic resin, e. g. an aldehyde and a substance forming with the aldehyde a condensation having the character of a synthetic resin, such as urea or phenol, and a catalyst for the formation of the synthetic resin, particularly an acid, are added. During the drying or heating treatment of a fabric impregnated with the said paste the starch will be fixed in such a way, that it cannot be washed out or can only be washed out to a very limited degree.

The starch paste is made by gelatinizing the starch with about 10–12 parts of water in the heat. If it is desired to obtain a finishing paste which is suitable for being used for a sufficiently long period of time, the said hot starch paste must be thoroughly cooled prior to the addition of the synthetic resin components and the catalyst, since otherwise condensation will progress already too rapidly in the solution, so that a stiff gel would be prematurely formed, which gel would no longer be suitable to serve as a finishing paste. If desired the synthetic resin component may be added to the hot starch paste either as such or in the shape of a pre-condensation product, but it will be necessary to take care that the paste is thoroughly cooled before the addition of the catalyst.

It has also been proposed (French Patent No. 826,881 and Dutch Patent 48,512) to use in the finishing treatment cold swelling starch preparations obtained by converting starch into cold swelling starch in the presence of an aldehyde, more particularly formaldehyde. For this purpose a mixture of starch or a starch derivative with a small quantity of water to which the aldehyde has been added is heated on a rotary drum to a temperature adapted to remove the water and to gelatinize the starch or starch derivative, while pressing out the mass under mechanical pressure to a thin layer which is simultaneously dried. In order to obtain water resisting layers from the said cold swelling starch preparations, the condensation of the starch with the aldehyde must be completed, which will be the case at higher temperatures in the presence of catalysts.

Prior to being used the said finishing agents are dissolved in cold water, whereby a paste is obtained which when dried on textile materials and the like will produce insoluble and water resistant layers. To these preparations or pastes there may be added synthetic resin components e. g. phenols, urea or urea derivatives, in order to increase the resistance to water of the layers thus formed by the presence of synthetic resins.

French Patent No. 881,495 discloses a process of manufacturing dry products, the solutions of which is cold water when dried on carriers will produce water insoluble layers, which process consists in mixing cold swelling starch with a polyfunctional etherifying and/or esterifying agent and the quantity of alkali that will be required or desired for effecting the etherification and/or esterification.

According to the invention it is possible to obtain in a very simple manner starch preparations that may be readily dissolved in cold water and will then produce solutions which after the addition of a catalyst for the condensation, e. g. an acid, when dried on the surface of a material will produce insoluble films, by mixing cold swelling starch with a synthetic resin component of the group consisting of urea, urea derivatives and phenols and an aldehyde capable of forming a synthetic resin with said synthetic resin component. In such a solution in the cold there will not yet occur any conversion, or only a very slow one, so that this solution will be adapted for use for a considerable time. When the solution is dried in the heat, e. g. when it is used for the finishing of fabrics, there will occur a reaction by which an insoluble starch preparation is produced.

The term "cold swelling starch" is used for a product obtained by heating a mixture of starch or a starch derivative with a limited proportion of water on a rotary drum to a temperature adapted to remove the water and to gelatinize the starch or starch derivative while pressing out the mass under mechanical pressure to a thin layer which is simultaneously dried.

The term "aldehydes" not only includes the aldehydes themselves, but also compounds yielding aldehydes, such as para-formaldehyde, trioxymethylene, and the like.

The catalyst for the condensation referred to in the claims is an acid or a substance generating acid when heated.

The synthetic resin component and the aldehyde may also be added in the form of a precondensate of the said substances. It is advantageous to use precondensates which are wholly or partly etherified and/or esterified and the term "precondensates" when used in the appending claims is meant to include such etherified and/or esterified precondensates.

The term "starch or a starch derivative" includes various kinds of native starch, such as potato, tapioca, corn, rice or wheat starch, soluble starch, dextrin, ethers or esters still containing free hydroxyl groups and/or mixtures of the said polysaccharides and the like.

The reaction that occurs during the drying of the solution in the heat may be explained as follows:

By the condensation of the synthetic resin component with an aldehyde such as formaldehyde there will first be formed a compound containing methylol groups, in the case of urea e. g. dimethylolurea. This is a substance which contains two or more reactive OH-groups and with regard to the cold swelling starch reacts as a polyfunctional etherifying agent in the sense of French Patent No. 881,495. As soon as the reaction takes place, which is the case when e. g. an acid is added as a catalyst, the desired insoluble compounds are formed. The particular advantages of the process according to the invention are partly due to the specific properties of the cold swelling starch. Cold swelling starch is soluble in cold water and in the present case this is a special advantage, as it is now possible to use dry preparations which already contain the synthetic resin components and the aldehyde, without any risk that the reaction will already occur when dissolving the product in water.

If use is made of starch products that will only dissolve in warm water it will be necessary first to prepare a starch solution in the heat and to cool this solution before adding the synthetic resin component, the aldehyde and the catalyst promoting the formation of the synthetic resin, since otherwise condensation would already occur when dissolving the starch product, so that the paste would gelatinize very soon.

By means of a starch preparation according to the invention, however, one obtains in a very simple manner an impregnating liquid that will be suitable for use during a long time, while a complete condensation will take place during the drying of the solution on a carrier, the said condensation being facilitated by the fact that cold swelling starch is more reactive than e. g. ordinary starch.

In some cases one may also add the catalyst, e. g. a solid acid, to the dry mixture, without any noticeable initial condensation taking place in the dry mixture, by which the solubility of the product would be reduced. In order to restrict or to avoid entirely the danger of a premature condensation, it is advantageous in this case to add the catalyst prior to or during the cold swelling starch process, so that the catalyst will be embedded in the cold swelling starch particles and consequently will hardly or not at all contact with the synthetic resin components. This contact will only occur when the dry preparation is dissolved in water.

If desired one may also add the substance forming a synthetic resin with the aldehyde, e. g. urea, if desired in combination with the catalyst, prior to or during the manufacture of the cold swelling starch.

It is also possible to make two cold swelling starch preparations in a similar way as described in French Patent No. 826,881 and in copending application Serial No. 707,321, one of the said preparations containing a catalyst, while the other contains the synthetic resin component and the aldehyde. If desired either the synthetic resin component or the aldehyde may be added to the cold swelling starch preparation containing the catalyst, in which case the other preparation consists of a mixture of cold swelling starch and the substance not incorporated in the first mentioned preparation.

Instead of adding the cold swelling starch, the synthetic resin component and the aldehyde as such, one may also prepare a pre-condensate from these substances and mix the said pre-condensate with the cold swelling starch. Such a mixture consisting of cold swelling starch and the pre-condensate will keep for a long time when in a dry condition; the reaction will only set in when the mixture is dissolved in water and heated in the presence of a catalyst, particularly if the solution is dried at a high temperature. In some cases the catalyst may already be incorporated into the dry cold swelling starch preparation preferably by adding the same prior to or during the manufacture of the cold swelling starch.

The pre-condensates of the synthetic resin may be used in different stages of condensation, such as the products that are only soluble in water to a limited degree or insoluble, provided that they are not yet completely condensed, but still contain a sufficient amount of reactive methylol groups for being able of reacting with starch to form water insoluble products.

It is known that it is possible to convert pre-condensates of synthetic resins with alcohols or to effect the preliminary condensation in the presence of alcohols, whereby etherified condensation products are formed (cf. British patent specifications No. 409,397 and 511 and German patent specification No. 729,029). It has now been found that the said etherified products have particular advantages for the purpose of the present invention, as they either contain no free hydroxyl groups or less free hydroxyl groups than the non-etherified products, so that the chance that the intermediate condensation products will prematurely react with the cold swelling starch as a polyfunctional reagent in the sense of French Patent No. 881,495, is still further reduced. If, however, the solution of the preparation is subsequently dried on a carrier with the addition of an acid or a compound producing an acid, the alcohol with which the intermediate condensation is esterified, is split off again, so that the formation of the insoluble starch compound will proceed in the normal manner.

Because of the slower reactivity with regard to the cold swelling starch molecule, it is generally possible when using such pre-condensates in which the hydroxyl groups are blocked up to add the catalyst already to the dry preparation, without risk that when the dry product is stored, its solubility will be reduced on account of an initial condensation. This possibility will still be reduced, if the catalyst is embedded in the cold swelling starch by being added prior to or during the manufacture thereof.

The hydroxyl groups of the pre-condensate may also be blocked up by esterification with an acid. The starch preparations described above have the property of being soluble in cold water, which has the advantage that there is no risk of a premature formation of insoluble starch compounds in the solution that may contain the synthetic resin components, or the pre-condensate thereof in the form of a solution, an emulsion or a suspension, e. g. the finishing paste. Finishing and sizing treatments by means of cold baths generally have the drawback that the liquid does not penetrate so easily into and between the fibres, on account of the higher degree of viscosity of the said cold solutions.

It would therefore be of advantage to be able to raise the temperature of the impregnating bath to e. g. about 50° C., if the said purpose could be attained without undue promotion of the condensation in the impregnating liquid whereby insoluble products would be prematurely formed. Such products, however, will be formed, if mixtures already containing an acid as a catalyst are dissolved in warm water. In this case one will therefore be obliged to use preparations that do not yet contain an acid; this acid must then be added separately and immediately before the finishing or sizing treatment, as the hot acid finishing or sizing paste will only remain fit for use during a very short time.

This difficulty may be obviated by adding to the mixture of cold swelling starch, a synthetic resin component and an aldehyde or an aldehyde producing substance or a pre-condensate thereof, such a quantity of a substance that has a non-acid or only slightly acid reaction, but which will produce acid, when heated, that a solution of the concentration, which is desired for the application, at moderately elevated temperature will remain fit for use for a sufficiently long time whereas the required acid reaction will be developed when the solution is dried on the carrier at a high temperature.

In this case therefore the finishing or sizing paste obtained by dissolving the dry mixture is non-acid or only slightly acid, so that at a temperature of approximately 50° C. the condensation only progresses very slowly and the bath will remain fit for use for a long time. When dried at a higher temperature, however, the mixture will become decidedly acid, so that insoluble layers which are very resistant to water will be obtained. Substances appropriate for this purpose are inter alia salts of sulphuric acid esters obtained from alkenes or alcohols, such as sodium hexyl sulphate, various ammonium salts, of strong inorganic as well as organic, preferably only slightly volatile acids, e. g. ammonium oxalate, substances having an adsorbing action, such as bleaching earths, diatomaceous earth or synthetic resins that have been treated with an acid and subsequently by washing with water have been freed from acid to such a degree that in an aqueous medium and at normal temperature they will show a practically neutral reaction, whereas they will produce acid at a higher temperature, and the like.

If desired, one may still add to the dry mixture, besides an acid or an acid producing substance, buffer substances, such as mixtures of primary and secondary alkali phosphate.

When using an acid as a catalyst, it is likewise possible to prepare finishing or sizing baths that at a moderately elevated temperature, e. g. about 50° C. will remain fit for use for a sufficiently long time by adding to the acid bath such a quantity of a water soluble organic base e. g. pyridine, monoethanolamine, or the like, that the acid will be partly or entirely neutralized. It has been found that cold swelling starch solutions, obtained according to the invention will gelatinize in the heat for much less quickly if such an organic base is added. If desired the organic base may be combined with starch in the form of a cold swelling starch by adding the said base prior to or during the cold swelling starch process.

It is of advantage for the manufacture of the preparations according to the invention to use cold swelling starch in which the starch molecule is more or less degraded and which have the property to produce with cold water a perfectly smooth, structureless viscous solution or paste. Cold swelling starches of this character may be obtained by adding prior to or during the cold swelling starch process, starch degrading substances, such as alkalies and/or oxidizing agents, acids and the like. In comparison with the usual non-degraded or practically non-degraded cold swelling starches, such cold swelling starches have the advantage that they are more readily soluble in water, that they will keep the synthetic resin components or the pre-condensate thereof, better in a state of solution or suspension and that they will produce a perfectly smooth solution or paste, so that it will be possible e. g. to obtain adhesives that may be readily applied with a brush and in a thinner layer and that may contain a larger proportion of cold swelling starch without producing too high a degree of viscosity. Moreover, such adhesives will blot less and will dry more quickly than adhesives of the same viscosity prepared with ordinary cold swelling starch.

When employed as an adhesive for wood in the manufacture of three- or multiply wood, the preparations obtained according to the invention from the said degraded cold swelling starches will produce much better results than these from non-degraded or slightly degraded cold swelling starches. Impregnating agents for textile materials, paper and the like prepared from the said degraded cold swelling starches will produce a far better penetration and clearer designs.

The above mentioned advantages of the degraded cold swelling starches may also be obtained, or improved by completely or partly etherifying and/or esterifying the said starches, e. g. by the process according to French Patent No. 874,436.

The preparations obtained according to the invention are particularly advantageous as finishing agents in the textile art, as the user is supplied with draw products that will readily dissolve in cold water thus forming a finishing paste which, either as such or after the addition of an acid or a compound producing an acid, will produce, when the fabrics impregnated therewith are dried at high temperatures, an excellent and perfectly water resistant finish. The preparations according to the invention may, however, be also used as sizing agents, thickening agents, adhesives and binders for all kinds of pulverulent, granular and fibrous materials, e. g. as a glue for wood or veneering, in sizing and printing paper as a binder for paint and the like.

If desired, the products according to the invention may also contain starch or a starch derivative which do not swell or dissolve in cold water; the said starch products will be suspended in the solution of the cold swelling starch and during the drying or heating process they will likewise react with the synthetic resin component and the aldehyde, or with the pre-condensate of the same.

The invention will be elucidated by the following examples.

Example 1

100 parts by weight of a non-decomposed or only slightly decomposed cold swelling starch made in a known manner from potato starch and 16 parts by weight of dimethylol urea are intimately mixed.

The dry preparation may be made into a finishing paste with the aid of the ten or fifteen fold quantity of water by means of which after the addition of a catalyst, e. g. acetic acid, there may be obtained a starch finish that is permanent to washing.

Example 2

200 parts by weight of urea are dissolved in 1500 parts by weight of water and 1000 parts by weight of native starch are suspended in the solution. The mixture is converted into cold swelling starch in the usual manner on a heated rotating cylinder at a temperature of approx. 130° C., and subsequently ground.

100 parts by weight of the cold swelling starch containing urea thus obtained, 20 parts by weight of paraformaldehyde and 1.5% parts by weight of ammonium chloride are intimately mixed.

Example 3

1000 parts by weight of cold swelling starch with a neutral reaction are intimately mixed with 50 parts by weight of dimethylol urea. One part by weight of this preparation is dissolved in 16 parts by weight of water, after which the solution is given a pH of 5 with phosphoric acid. 12 parts by weight of this acid cold swelling starch solution are mixed with 133 parts by weight of coal slack, after which the mixture is stirred for some time, so that a thorough mixture is obtained. The mixture of coal and cold swelling starch paste is pressed into briquettes in a press at room temperature under a pressure of 250–300 kg./sq. cm., which are burned at a temperature of 125% C. The briquettes thus obtained are highly water resistant.

Example 4

10–25 parts by weight of ethylene oxide are slowly introduced while being stirred at a temperature of 40–60° C. into an alkaline starch paste obtained by mixing 200 parts by weight of potato starch, 400 parts by weight of water and 30 parts by weight of a 30% caustic soda solution. After a reaction period of an hour or a little more the alkaline mass is neutralized with concentrated hydrochloric acid, after which the entire reaction mixture is converted into cold swelling starch in the usual manner (cf. Example IV of French Patent No. 874,436).

100 parts by weight of the hydroxy ethyl ether of starch, thus prepared are intimately mixed with 20 parts by weight of dimethylol urea. The dry mixture which will keep for a long time will readily dissolve in 10 parts by weight of cold water, forming a transparent solution which, after the addition of an acid, e. g. phosphoric acid, is particularly suitable for producing wash proof finishes or sizings on dyed or printed textile fabrics that will not cloud the designs printed on the said fabrics.

Example 5

A suspension of 1000 parts by weight of starch in 1000 parts by weight of water is treated in an alkaline medium with 10–100 parts by weight of a 3% hydrogen peroxide solution and subsequently converted in the usual manner into cold swelling starch in a practically neutral or faintly alkaline medium. A mixture of 300 parts by weight of urea and 750 parts by weight of a 40% commercial formaline is given a pH of 4.5 by means of sulphuric acid and then heated with a reflux cooler while stirring until the exothermic reaction sets in. When the exothermic reaction is finished the reaction mixture is immediately given a pH of 6 with a caustic soda solution and then dried in thin layers in vacuo at a temperature of 80–90 C., pulverized by grinding and sifted, if necessary.

100 parts by weight of the pre-condensation product of urea and formaldehyde thus prepared are intimately mixed with 30 parts by weight of the above mentioned cold swelling starch. The mixture, which in dry condition will keep indefinitely, may be used to advantage as a wood glue. 10 parts by weight of the dry preparations are dissolved in 12.5 parts by weight of cold water, and one part by weight of an ammoniacal 15% solution of ammonium chloride is added to the said solution. A poplar wood board having a thickness of 4 mm. is coated on both sides with the glue thus obtained and joined cross-wise in the usual manner to two pieces of poplar veneer not treated with glue, by pressing the boards together for a few minutes, at a temperature of 95–105° C. and a pressure of 9 kgs./sq. cm. When the component parts are separated there will not be any rupture in the coating of glue, but practically completely in the wood.

Example 6

1000 parts by weight of a decomposed cold swelling starch which with 3–4 parts by weight of cold water produces a very smooth paste are mixed with 240 parts by weight of p cresol di-alcohol. The mixture is absolutely stable in dry condition.

Example 7

40 parts by weight of dimethyol urea with a melting point of 126° C. are dissolved while heating in 400 parts by volume of methanol to which a few drops of dilute sulphuric acid have been previously added. The mixture is boiled a few minutes, after which the acid is neutralized with barium carbonate. The barium sulphate thus formed and the excess of barium carbonate are filtered off and the methanol is removed for the greater part from the filtrate by distillation. When the mixture has cooled down, the dimethyl ether of dimethylol urea will separate from the concentrated filtrate. One obtains 21 parts by weight of the ether with a melting point of 96° C. (cf. Bull. Chem. Soc. Japan 11 (1936, 248)).

20 parts by weight of the dimethylether of dimethylol urea are intimately mixed with 100 parts by weight of a cold swelling starch prepared in the usual manner from tapioca starch.

We claim:

1. A dry stable starch preparation soluble in cold water to a solution which when dried on the surface of a material in the presence of an acid catalyst for the condensation will produce insoluble films, the said preparation comprising a mixture of a precondensate of formaldehyde and a substance taken from the group consisting of urea, thiourea, phenol and cresol, and a hydroxy alkyl ether of cold swelling starch in which the starch molecule is degraded by the alkaline treatment required for the ether preparation, it being degraded to such an extent that when dissolved in cold water it produces a perfectly smooth, viscous, structureless paste, the components of said mixture being present in the form of discrete, separate particles.

2. A dry stable starch preparation according to claim 1 in which the hydroxy alkyl ether is hydroxy ethyl ether.

3. A dry stable starch preparation soluble in cold water to a solution which when dried on the surface of a material in the presence of an acid catalyst for the condensation will produce insoluble films, the said preparation comprising a mixture of a precondensate of formaldehyde and a substance taken from the group consisting of urea, thiourea, phenol and cresol, and a hydroxy alkyl ether of cold swelling starch in which the starch molecule is degraded by the alkaline treatment required for the ether preparation, it being degraded to such an extent that when dissolved in cold water it produces a perfectly smooth, viscous, structureless paste, and a substance generating acid when heated, the components of said mixture being present in the form of discrete, separate particles.

4. A dry stable starch preparation, according to claim 3, in which the hydroxy alkyl ether is a hydroxy ethyl ether.

5. A dry stable starch preparation according to claim 3 in which the acid generating substance is a solid and in admixed form with the hydroxy alkyl ether of cold swelling starch and thereby forming starch coated acid particles.

6. A dry stable starch preparation according to claim 3 in which the acid generating substance is a solid and in admixed form with the hydroxy ethyl ether of cold swelling starch and thereby forming starch coated acid particles.

JAN LOLKEMA.
WILLEM ALBERTUS van der MEER.

REFERENCES CITED

The following references are of record in the file of this patent:

UNITED STATES PATENTS

| Number | Name | Date |
| --- | --- | --- |
| 2,121,076 | Ellis | June 21, 1938 |
| 2,212,314 | Bauer | Aug. 20, 1940 |
| 2,246,635 | Moller | June 24, 1941 |
| 2,275,314 | Pierson | Mar. 3, 1942 |
| 2,385,438 | Fowler | Sept. 25, 1945 |
| 2,400,820 | Glarum | May 21, 1946 |

FOREIGN PATENTS

| Number | Country | Date |
| --- | --- | --- |
| 809,932 | France | Dec. 19, 1936 |
| 881,495 | Franc | Jan. 28, 1943 |